(12) United States Patent
Lozano et al.

(10) Patent No.: US 10,052,246 B2
(45) Date of Patent: Aug. 21, 2018

(54) AUTONOMOUS WHEELCHAIR

(71) Applicant: DENSO International America, Inc., Southfield, MI (US)

(72) Inventors: Michael Lozano, Detroit, MI (US); Marc Arceo, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/446,371

(22) Filed: Mar. 1, 2017

(65) Prior Publication Data

US 2017/0266069 A1   Sep. 21, 2017

Related U.S. Application Data

(60) Provisional application No. 62/308,458, filed on Mar. 15, 2016.

(51) Int. Cl.
*A61G 5/00* (2006.01)
*A61G 5/10* (2006.01)
*A61G 5/04* (2013.01)
*G05D 1/00* (2006.01)
*G05D 1/02* (2006.01)

(52) U.S. Cl.
CPC ............. *A61G 5/1051* (2016.11); *A61G 5/04* (2013.01); *G05D 1/0061* (2013.01); *G05D 1/0212* (2013.01); *A61G 2203/14* (2013.01); *A61G 2203/16* (2013.01); *A61G 2203/22* (2013.01); *A61G 2203/30* (2013.01); *A61G 2203/46* (2013.01); *A61G 2203/70* (2013.01); *A61G 2210/70* (2013.01); *A61G 2210/90* (2013.01)

(58) Field of Classification Search
None
See application file for complete search history.

(56) References Cited

U.S. PATENT DOCUMENTS

| | | | |
|---|---|---|---|
| 5,324,060 A * | 6/1994 | Van Vooren | A61G 5/023 280/304.1 |
| 6,092,822 A * | 7/2000 | Salmon | A61G 5/023 280/250.1 |
| 6,106,440 A * | 8/2000 | Olbrish, Jr. | A63B 22/0605 280/234 |
| 6,154,690 A * | 11/2000 | Coleman | A61G 5/006 180/65.1 |
| 6,842,692 B2 | 1/2005 | Fehr et al. | |
| 7,383,107 B2 | 6/2008 | Fehr et al. | |
| 8,123,685 B2 * | 2/2012 | Brauers | A61B 5/103 5/11 |
| 9,724,829 B2 * | 8/2017 | Hyde | B25J 11/009 |
| 9,757,289 B1 * | 9/2017 | Simons | A61G 5/024 |

(Continued)

FOREIGN PATENT DOCUMENTS

| | | |
|---|---|---|
| CN | 103110485 A | 5/2013 |
| GR | 1006425 B | 6/2009 |

*Primary Examiner* — Jonathan M Dager
(74) *Attorney, Agent, or Firm* — Harness, Dickey & Pierce, P.L.C.

(57) ABSTRACT

The present teachings provide for wheelchair including a control module, manual drive controls, a camera, biometric sensors, and an antenna. The control module includes an autonomous drive module configured to autonomously pilot the wheelchair. The biometric sensors are configured to measure biometric information of a user of the wheelchair.

21 Claims, 2 Drawing Sheets

(56) References Cited

U.S. PATENT DOCUMENTS

| | | | | |
|---|---|---|---|---|
| 9,795,524 B2* | 10/2017 | Richter | .................. | A61G 5/047 |
| 2004/0006422 A1* | 1/2004 | Fehr | ....................... | G01O 21/20 |
| | | | | 701/23 |
| 2007/0055424 A1* | 3/2007 | Peters | ..................... | A61G 5/04 |
| | | | | 701/36 |
| 2007/0100511 A1* | 5/2007 | Koerlin | ..................... | A61F 4/00 |
| | | | | 701/1 |
| 2008/0300777 A1* | 12/2008 | Fehr | ....................... | G01O 21/20 |
| | | | | 701/532 |
| 2009/0218855 A1* | 9/2009 | Wolas | ..................... | A47O 7/74 |
| | | | | 297/180.14 |
| 2011/0153362 A1 | 6/2011 | Valin et al. | | |
| 2011/0168478 A1* | 7/2011 | Kuo | ....................... | B60K 26/02 |
| | | | | 180/315 |
| 2011/0264007 A1* | 10/2011 | Meyers | .................. | A61B 5/103 |
| | | | | 600/587 |
| 2012/0052469 A1* | 3/2012 | Sobel | ..................... | A61B 5/087 |
| | | | | 434/262 |
| 2012/0101402 A1* | 4/2012 | Nguyen | ............... | A61B 5/7264 |
| | | | | 600/544 |
| 2012/0136666 A1* | 5/2012 | Corpier | ............... | H04L 12/2829 |
| | | | | 704/275 |
| 2012/0143400 A1* | 6/2012 | Hinkel, III | ............... | B62D 1/00 |
| | | | | 701/2 |
| 2012/0316884 A1* | 12/2012 | Rozaieski | ................ | A61G 5/10 |
| | | | | 704/275 |
| 2013/0218380 A1* | 8/2013 | Phillips | ............... | B60L 11/1805 |
| | | | | 701/22 |
| 2013/0240271 A1* | 9/2013 | Tallino | .................... | A61G 5/047 |
| | | | | 180/11 |
| 2014/0110978 A1* | 4/2014 | Schneider | ................ | A61G 5/10 |
| | | | | 297/180.1 |
| 2014/0262575 A1* | 9/2014 | Richter | .................. | A61G 5/047 |
| | | | | 180/167 |
| 2014/0277894 A1 | 9/2014 | Doyle et al. | | |
| 2014/0379224 A1* | 12/2014 | Hyde | ..................... | B60N 2/002 |
| | | | | 701/49 |
| 2015/0066284 A1 | 3/2015 | Yopp | | |
| 2015/0298765 A1* | 10/2015 | Golden, Jr. | ............... | A61G 5/10 |
| | | | | 180/206.3 |
| 2015/0351979 A1* | 12/2015 | Conte | .................... | A61G 5/047 |
| | | | | 180/13 |
| 2017/0048651 A1* | 2/2017 | Lin Charna | ........... | H04W 4/008 |

\* cited by examiner

AUTONOMOUS WHEELCHAIR

CROSS-REFERENCE TO RELATED APPLICATION

This application claims the benefit of U.S. Provisional Application No. 62/308,458 filed on Mar. 15, 2016, the entire disclosure of which is incorporated herein by reference.

FIELD

The present disclosure relates to an autonomous wheelchair.

BACKGROUND

This section provides background information related to the present disclosure, which is not necessarily prior art. While current wheelchairs are suitable for their intended use, they are subject to improvement. The present teachings provide for an improved wheelchair that is advantageously autonomous and includes numerous mobility, safety, and convenience features as described herein.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figures 1A, 1B:
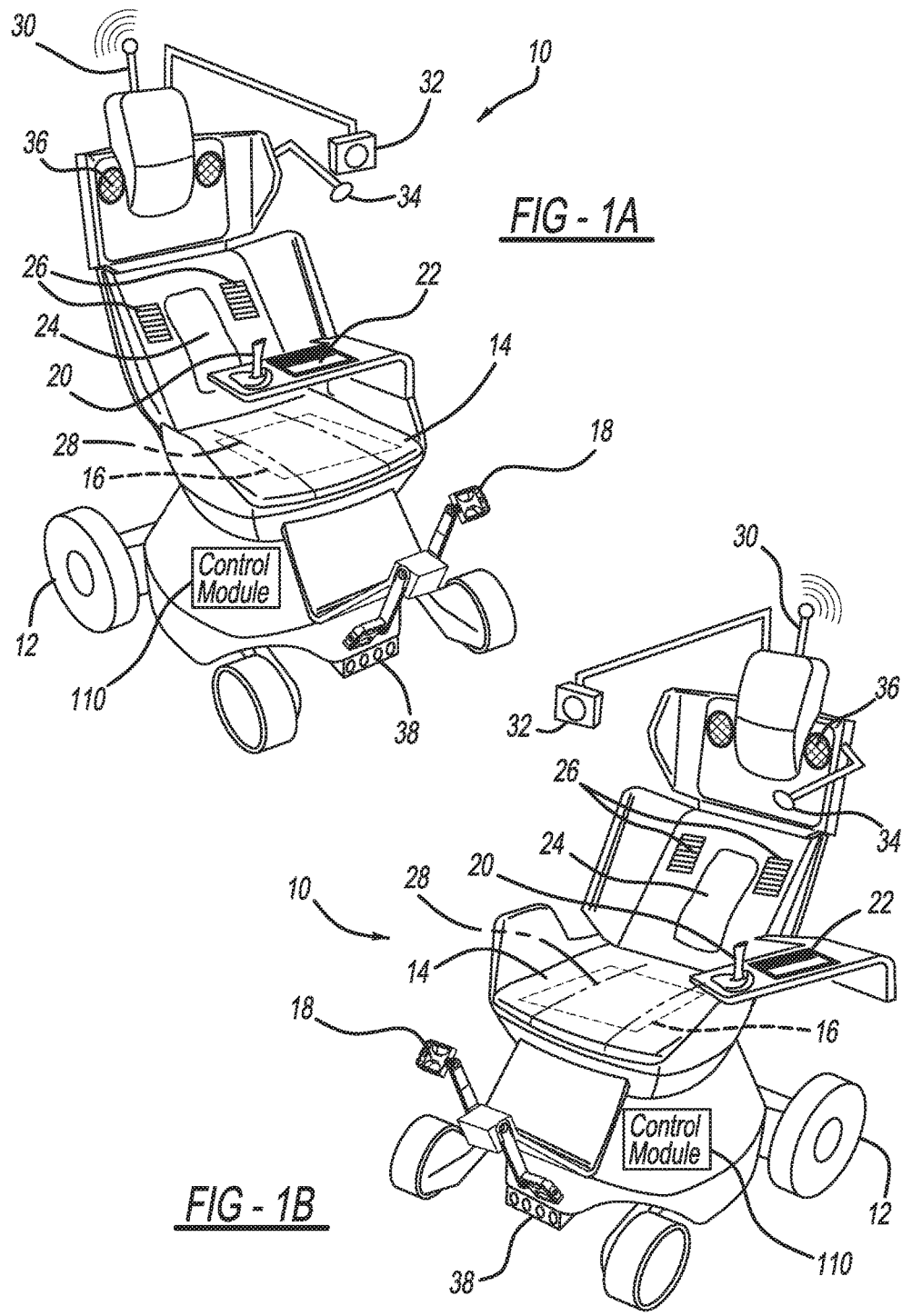
FIG. 1A is a perspective view of a wheelchair according to the present teachings.
FIG. 1B is another perspective view of the wheelchair according to the present teachings.

With initial reference to FIGS. 1A and 1B, a wheelchair according to the present teachings is generally illustrated at reference numeral 10. The wheelchair 10 generally includes wheels 12, which support a seat 14. The seat 14 includes seat pressure sensor 16, which is configured to sense when a user is seated in the wheelchair 10 based on the amount of pressure exerted upon the seat 14. The wheelchair 10 can be powered in any suitable manner. For example, the wheelchair 10 can be battery powered or manually powered. The wheelchair 10 can include pedals 18, which are configured to propel the wheelchair 10 when actuated by a user.

The wheelchair 10 can be steered by the user using any suitable input or control device, such as a joystick 20. The wheelchair 10 can also include any other suitable input device, such as a touch screen 22, which may be configured to receive inputs in any suitable manner. For example, the touch screen 22 can be configured to display a keypad.

The wheelchair 10 can be outfitted with biometric sensors 24 in any suitable manner. For example, the biometric sensors 24 can be included within or around the seat 14. The biometric sensors 24 can be any suitable sensors and monitoring devices configured to sense and monitor biometrics of a user seated in the wheelchair 10. For example, the biometric sensors 24 can be configured to measure and monitor the user's temperature, heart rate, blood pressure, and any other parameters of interest.

The wheelchair 10 can further include a heating, ventilation, and air cooling (HVAC) system 26. The HVAC system 26 is configured to facilitate regulation of the user's body temperature, as well as the environment about the user. The HVAC system 26 may take any suitable form, and may include air vents at or proximate to the seat 14. The air vents may be configured to direct warm and/or cool air to the user. The air may be warmed and/or cooled by any suitable HVAC components within the wheelchair 10, such as an evaporator and/or heater core. The seat 14 may also include a heating element 28 configured to heat the seat 14. The heating element 28 can be any suitable heating element, and can include electrodes extending about the seat 14.

The wheelchair 10 further includes an antenna 30. The antenna 30 can be any suitable antenna. For example, the antenna 30 can be a Wi-Fi antenna configured to communicate with any suitable Wi-Fi system, a Bluetooth antenna, a cellular antenna, and/or a GPS antenna including a GPS receiver. As described further herein, the antenna 30 can be used for transmitting biometric information of the user gathered from the biometric sensors 24 to any suitable third party, such as a medical professional. The antenna 30 can also receive GPS signals for navigating the wheelchair 10, particularly when the wheelchair 10 is autonomously driven. The antenna 30 can also be used for voice and/or visual communication with any third party.

A camera 32 can be included to facilitate video communication with a third party, as well as biometric identification of a user of the wheelchair 10. The camera 32 can be configured to detect, for example, eye movement, facial features, etc. The camera 32 can also transmit images to third parties to allow third parties, such as medical professionals and/or family members, to monitor the user of the wheelchair 10 and the surrounding environment.

To facilitate voice communication with third parties, the wheelchair 10 can include a microphone 34. The microphone 34 is also configured to receive voice commands from the user of the wheelchair 10, or any other person proximate to the wheelchair 10 or communicating with the wheelchair 10 remotely, as described herein. The wheelchair 10 further includes speakers 36, which can be used to broadcast navigational commands, broadcast the voice of third parties that the user is communicating with, sound warnings/alerts to the user, or for any other suitable purpose.

The wheelchair 10 further includes any suitable guidance sensor 38. The guidance sensor 38 is configured to detect objects that may obstruct the path of travel of the wheelchair 10, as well as identify any suitable markings for guiding the wheelchair 10 along a particular path. For example, the guidance sensor 38 is configured to identify lane markers in order to prevent the wheelchair 10 from straying from an intended lane of travel. The guidance sensor 38 is also configured to identify any other line or markings on a floor, street, or any other path of travel in order to facilitate travel of the wheelchair 10 and to keep the wheelchair 10 along a desire path of travel. The guidance sensor 38 can be any suitable sensor and can include, for example, a camera configured to recognize obstructions and route paths.

Figure 2:
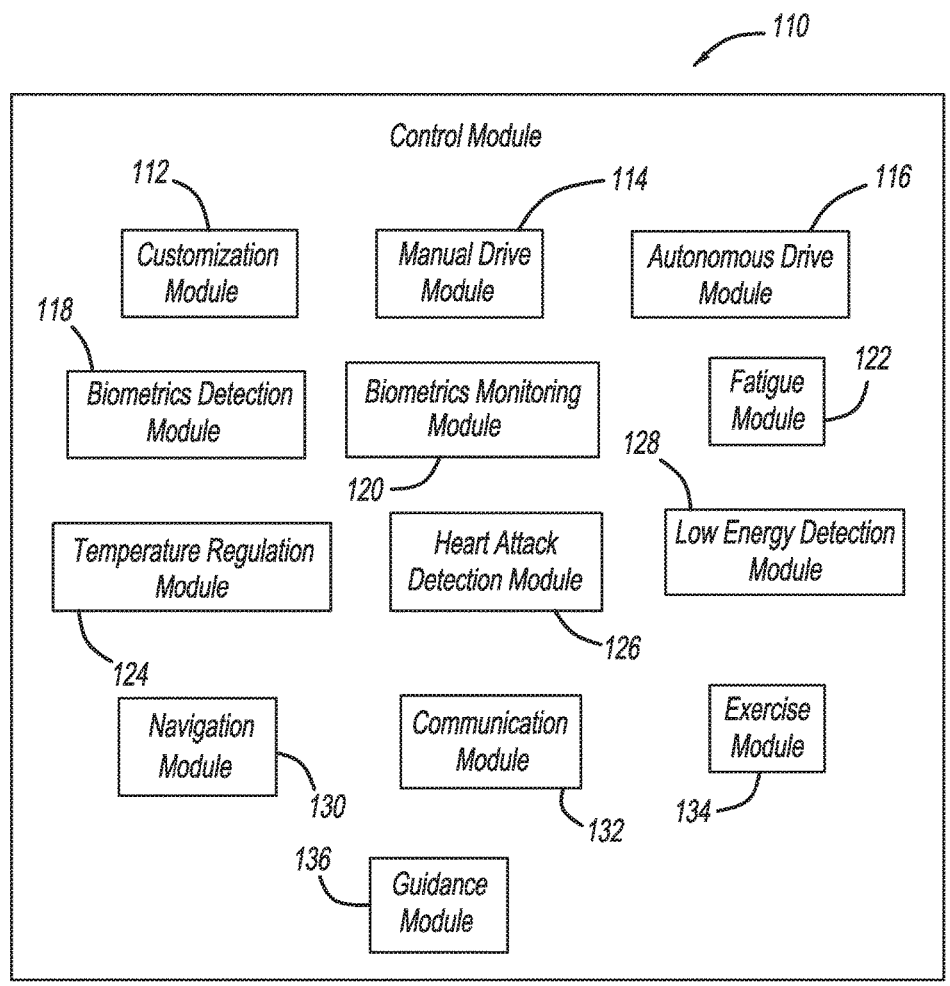
FIG. 2 illustrates a control module according to the present teachings.

With continued reference to FIGS. 1A and 1B, and additional reference to FIG. 2, the control module 110 will now be described in detail. In this application the term "module" or the term "controller" may be replaced with the term "circuit." The term "module" may refer to, be part of, or include processor hardware (shared, dedicated, or group)

that executes code, and memory hardware (shared, dedicated, or group) that stores code executed by the processor hardware. The code is configured to provide the features of the modules, controllers, and systems described herein. The control module 110 may be any suitable controller or processor including, in communication with, or coupled to, the various modules 112-136 illustrated in FIG. 2, for example, as well as any other suitable modules or controllers configured to provide the features described herein.

The control module 110 includes a customization module 112, which is configured to customize settings of the wheelchair 10 in any suitable manner. For example, when a user approaches and/or sits in the wheelchair 10, the user will be recognized in any suitable manner, such as with face recognition using the camera 32. The customization module 112 is configured to upload the user's biometric profile from any suitable source, such as a cloud-based medical records site. Based on the user's biometric profile or any customization settings, the control module 112 is configured to adjust the wheelchair 10, such as adjust the HVAC 26, the suspension, saved favorite location coordinates such as the user's home, preferred medical professional contact information, and family contact information, for example.

Manual drive module 114 is configured to allow the user to manually pilot the wheelchair 10. For example, in response to inputs to the manual drive module 114 from the joystick 20, the manual drive module 114 will move the wheelchair 10 as desired by the user. The user may also enter inputs for piloting the wheelchair 10 using the touch screen 22, or any other suitable input device. The user may propel the wheelchair 10 manually by actuating the pedals 18.

An autonomous drive module 116 is provided for autonomous piloting of the wheelchair 10. The wheelchair 10 can be autonomously piloted in any suitable manner from any suitable source. For example and as described herein, if the control module 110 detects an emergency, such as a heart attack, the autonomous drive module 116 is configured to pilot the wheelchair 10 to the closest medical professional, or any other predetermined location where the user can receive suitable treatment. The autonomous drive module 116 can pilot the wheelchair 10 based on GPS coordinates received by the antenna 30, for example. When the wheelchair 10 is being operated indoors, the antenna 30 can receive coordinate information from any other suitable source, such as directional beacons.

The wheelchair 10 can further include a biometrics detection module 118. The biometrics detection module 118 is configured to detect, measure, and monitor, any suitable biometrics parameters of the user. For example, the biometrics detection module 118 is configured to detect when the user is fatigued, such as by tracking eye movement and through face recognition. The biometrics detection module 118 is further configured to detect heat stroke by monitoring the user's temperature based on inputs received from the biometrics sensor 24, as well as monitor heart conditions based on inputs from a heart monitor and blood pressure system of the biometrics sensor 24. A biometrics monitoring module 120 is configured to monitor inputs from the biometric sensors 24 and direct the inputs to various other modules in order to permit monitoring of various user conditions, as described herein.

The control module 110 includes a fatigue module 122, which is configured to determine when the user has fallen asleep or reached a level of fatigue greater than a predetermined level. The fatigue module 122 detects the fatigue level of the user in any suitable manner, such as based on eye movement and facial recognition. When the fatigue module 122 determines that the user is asleep or has reached a level of fatigue greater than a predetermined level, the autonomous drive module 116 is engaged in order to pilot the wheelchair 10 to a predetermined location, such as the user's home. If the user awakens or becomes less fatigue, the user can override the autonomous drive module 116 in any suitable manner, such as by inputting a command using the joystick 20 and/or the touch screen 22.

A temperature regulation module 124 is included to receive inputs from the biometric sensors 24 representing the temperature of the user. If the user's temperature is higher or lower than acceptable predetermined levels, the temperature regulation module 124 operates the HVAC 26 to generate heat or cold air in order to return the user's temperature to an acceptable level.

A heart attack detection module 126 is included to identify heart events experienced by the user, such as a heart attack. The heart events can be determined based on inputs from the biometric sensors 24, such as heart monitor and/or blood pressure sensors. When the heart attack detection module 126 determines that a heart attack or other heart event has taken place, the heart attack detection module 126 engages the autonomous drive module 116 to pilot the wheelchair 10 to a predetermined area, such as a safe resting place, a medical professional, a hospital, a clinic, or any other suitable location. The heart attack detection module 126 is further configured to request assistance from emergency personnel (such as 911 emergency assistance) and alert family and medical professionals. The heart attack detection module 126 will send GPS coordinates of the wheelchair's location to these third parties, and locate the nearest person with a medical wheelchair application.

The present teachings further provide for a medical wheelchair application for a smartphone, tablet, desktop, wearable, or other computing device. The wheelchair user, family members, and medical personnel can all have the same login (name and password) to the application. The user can be logged in as they approach the chair with face recognition. The application can be configured such that a third party (family/doctor) can message the user, monitor the user, receive notification of the user's condition, and provide relief to the user via onboard systems, such as by remotely operating the HVAC. The application can be configured to notify third party users of the application, such as nearby pedestrians, that the user or another user is in distress in an effort to get the user the assistance that he/she needs. Emergency personnel can also access the application to gather information about the user when responding to a distress call from the user or other person/entity.

The wheelchair 10 further includes a low energy detection module 128, which is configured to identify when the energy level of the wheelchair 10 is below a predetermined level. The wheelchair 10 can be powered in any suitable manner, such as by battery power. When the low energy detection module 128 determines that the battery power is below a predetermined level, the low energy detection module 128 will engage the autonomous drive module 116 to pilot the wheelchair 10 to the nearest refueling station, or other suitable predetermined location.

The wheelchair 10 further includes a navigation module 130, which is configured to navigate the wheelchair 10 to any predetermined location, or any location input by the user, or input remotely by a third party. For example, if the user inputs a command or a request, such as by way of a voice command using the microphone 34, informing the control module 110 that the user is lost, the navigation module 130 will plot a route for the wheelchair 10 to return to the user's home, or any other predetermined location. The navigation module 130 can engage the autonomous drive module 116 in order to autonomously pilot the wheelchair 10 to the user's home or other predetermined location.

The wheelchair 10 further includes a communications module 132, which is configured to allow the user to communicate, such as by way of the antenna 30, to any suitable third party, such as family members and/or medical professionals. The communications module 132 is configured to provide the voice and/or video communication. The communications module 132 is further configured to notify designated persons, such as family members and/or medical professionals, of the user's location, medical condition, and general status. For example, when the user sits within the wheelchair 10 and the user is detected as seated in the wheelchair 10 by the pressure sensor of the seat 14 and/or by the camera 32, the communications module 132 is configured to send a signal to designated personnel and inform them that the user is seated within the wheelchair 10. The communications module 132 is configured to then transmit the user's biometric information to these third parties, which allows the third parties to actively monitor the user's biometric parameters in real time. If irregularities are noticed by any of the third parties, they may send any suitable notification to one another. For example the communications module 132 can be configured for doctor monitoring. The doctor and/or the doctor's office can receive the biometric information of the user in real time in order to monitor the patient's well-being, and take action to provide necessary care as appropriate.

The communications module 132 can continuously listen for voice commands from the user or third parties. For example, if the user is communicating with his or her granddaughter through a cellular voice connection, the communications module 132 will be able to monitor the granddaughter's voice, and when she, for example, reminds her grandparent to take their medication in ten minutes, the communications module 132 will store this reminder, and generate an appropriate reminder to the user of the wheelchair 10 to take his or her medication at the appropriate time.

The wheelchair 10 further includes an exercise module 134. The exercise module 134 is configured to disengage the autonomous drive when so instructed by the user, and allow the user to manually propel the wheelchair 10 using, for example, the pedals 18 in order to allow the user to exercise when desired. The biometric sensors 24 will monitor the biometric conditions of the user as he or she exercises, and the temperature regulation module 124 will operate the HVAC 26 to regulate the user's body temperature as he or she exercises, so as to help the user exercise safely.

The wheelchair 10 further includes a guidance module 136. The guidance module 136 is in receipt of inputs from the guidance sensor 38 in order to help guide the wheelchair 10 along an intended path, such as along lane markers of a road, or any guidance markers. The guidance module 136 also allows the wheelchair 10 to avoid obstacles. For example, if the guidance sensor 38 detects an object in the path of the wheelchair 10, such as a squirrel that has run in front of the wheelchair 10, the guidance module 136 will engage the brakes of the wheelchair 10 to help avoid a collision.

The control module 110 is further configured to detect when the user has exited the wheelchair 10. For example, if the pressure sensor of the seat 14 and/or the camera 32 detects that the user is no longer seated in the wheelchair 10, the control module 110 sends a notification to designated third parties, such as family members and/or medical professionals, to inform them that the user has left the wheelchair 10. The communications module 132 will then transmit video from the camera 32 to the designated third parties to allow them to monitor the user and the user's condition.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A wheelchair comprising:
   a control module including an autonomous drive module configured to autonomously pilot the wheelchair;
   manual drive controls;
   a camera;
   biometric sensors configured to measure biometric information of a user of the wheelchair;
   an antenna; and
   a biometrics detection module and a customization module, wherein:
      upon sitting in the wheelchair the biometrics detection module scans biometric parameters of the user to match the user with a user profile stored at the control module or at a remote server; and
      the customization module customizes contact information, user medical information, and settings of the wheelchair based on previously stored preferences of the identified user.

2. The wheelchair of claim 1, further comprising a microphone, a touchscreen input device, and a heating, ventilation, and air cooling (HVAC) system.

3. The wheelchair of claim 1, further comprising pedals that propel the wheelchair when actuated.

4. The wheelchair of claim 1, wherein the manual drive controls include a joystick.

5. The wheelchair of claim 1, further comprising a guidance sensor.

6. The wheelchair of claim 1, further comprising a heating, ventilation, and air cooling (HVAC) system including cooling vents, heating vents, and a heated seat.

7. The wheelchair of claim 1, wherein the biometric sensors are configured to measure at least one of the following biometric parameters of a user of the wheelchair: temperature, heart rate, blood pressure, and pulse.

8. The wheelchair of claim 1, wherein the antenna includes a GPS receiver.

9. The wheelchair of claim 1, further comprising a manual drive module configured to manually pilot the wheelchair.

10. The wheelchair of claim 1, further comprising a fatigue module configured to detect user fatigue and autonomously drive the wheelchair to a predetermined location when user fatigue reaches a predetermined level;
    wherein driver fatigue is measured based on eye tracking and face recognition using the camera.

11. The wheelchair of claim 1, further comprising a temperature regulation module configured to monitor a user's temperature using the biometric sensors;
    wherein when the user's temperature exceeds a predetermined temperature, the temperature regulation module activates a heating, ventilation, and air cooling system of the wheelchair to reduce the user's temperature to or below the predetermined temperature.

12. The wheelchair of claim 1, further comprising a heart attack detection module;
    wherein upon detection of a heart attack based on inputs from the biometric sensors, the heart attack detection module: pilots the wheelchair to a safe resting area; requests emergency assistance; alerts medical personnel; alerts predetermined persons including family members; transmits GPS coordinates of the wheelchair to emergency response personnel, medical personnel, and the predetermined persons; and locates nearest person with medical wheelchair application.

13. The wheelchair of claim 1, further comprising a low energy detection module configured to monitor propulsion energy of the wheelchair available;
    wherein upon detecting that propulsion energy of the vehicle has dropped below a predetermined level, the low energy detection module commands the autonomous drive module to pilot the wheelchair to a nearest energy replenishment station, or to a predetermined location.

14. The wheelchair of claim 1, further comprising a navigation module configured to command the autonomous drive module to pilot the wheelchair to a predetermined location when the user generates an input informing the control module that the user is lost.

15. The wheelchair of claim 1, further comprising a navigation module configured to generate a navigation route for the wheelchair to a destination input by the user, and command the autonomous drive module to pilot the wheelchair to the destination when autonomous drive mode is selected.

16. The wheelchair of claim 1, further comprising a communication module configured to inform at least one predetermined person when the user sits in the wheelchair, and to transmit biometric information gathered by the biometric sensors to the at least one predetermined person.

17. The wheelchair of claim 1, further comprising:
    a guidance sensor configured to maintain the wheelchair in a selected lane of travel; and
    a guidance module configured to guide the wheelchair away from obstacles;
    wherein the guidance module is configured to activate brakes of the wheelchair to avoid an obstacle detected by the guidance sensor.

18. The wheelchair of claim 1, further comprising a seat sensor configured to detect when the user has left the wheelchair;
    wherein the communications module is configured to generate an alert to predetermined persons informing them that the user has left the wheelchair.

19. The wheelchair of claim 1, further comprising pedals configured for propelling the wheelchair when actuated by the user.

20. A wheelchair comprising:
    a control module including an autonomous drive module configured to autonomously pilot the wheelchair;
    manual drive controls;
    a camera;
    biometric sensors configured to measure biometric information of a user of the wheelchair;
    an antenna; and a fatigue module configured to detect user fatigue and autonomously drive the wheelchair to a predetermined location when user fatigue reaches a predetermined level;

wherein driver fatigue is measured based on eye tracking and face recognition using the camera.

21. A wheelchair comprising:

a control module including an autonomous drive module configured to autonomously pilot the wheelchair;

manual drive controls;

a camera;

biometric sensors configured to measure biometric information of a user of the wheelchair;

an antenna; and a navigation module configured to command the autonomous drive module to pilot the wheelchair to a predetermined location when the user generates an input informing the control module that the user is lost.

* * * * *

UNITED STATES PATENT AND TRADEMARK OFFICE
CERTIFICATE OF CORRECTION

PATENT NO.       : 10,052,246 B2
APPLICATION NO.  : 15/446371
DATED            : August 21, 2018
INVENTOR(S)      : Michael Lozano et al.

Page 1 of 1

It is certified that error appears in the above-identified patent and that said Letters Patent is hereby corrected as shown below:

In the Claims

Column 7, Line 40, In Claim 2, delete "touchscreen" and insert --touch screen-- therefor Signed and Sealed this
Fourth Day of June, 2019

Andrei Iancu
*Director of the United States Patent and Trademark Office*